United States Patent [19]
Cyr et al.

[11] Patent Number: 5,890,075
[45] Date of Patent: Mar. 30, 1999

[54] METHOD FOR REMOTELY UPDATING DATA STORED IN A MOBILE TERMINAL BY A WIRELESS TELECOMMUNICATIONS SYSTEM

[75] Inventors: Bernard Louis Cyr, Aurora; John Matthew Gafrick, Naperville; Mark Alan McCormick, Naperville; Steven James Pilgrim, Naperville, all of Ill.

[73] Assignee: Lucent Technologies Inc., Murray Hill, N.J.

[21] Appl. No.: 731,811

[22] Filed: Oct. 21, 1996

[51] Int. Cl.$^6$ ............................ H04Q 7/38; H04Q 9/02
[52] U.S. Cl. .................. 455/560; 455/411; 455/433; 455/435; 340/825.34; 380/44
[58] Field of Search ...................... 455/560, 561, 455/435, 434, 433, 411, 410, 419; 380/43, 44, 21, 25; 340/825.34

[56] References Cited

U.S. PATENT DOCUMENTS

| | | | |
|---|---|---|---|
| 4,827,499 | 5/1989 | Warty et al. | 379/58 |
| 5,159,634 | 10/1992 | Reeds, III | 380/42 |
| 5,204,902 | 4/1993 | Reeds, III et al. | 380/44 |
| 5,226,071 | 7/1993 | Bollinger et al. | 379/60 |
| 5,404,404 | 4/1995 | Novorita | 380/21 |
| 5,455,863 | 10/1995 | Brown et al. | 455/410 |
| 5,524,135 | 6/1996 | Mizikovsky et al. | 455/411 |
| 5,551,073 | 8/1996 | Sammacro | 455/411 |
| 5,708,710 | 1/1998 | Duda | 380/21 |
| 5,794,139 | 8/1998 | Mizikovsky et al. | 455/403 |
| 5,799,084 | 8/1998 | Gallagher et al. | 380/23 |

OTHER PUBLICATIONS

"On The Road With Autoplex™ System 1000," *AT&T Technology*, pp. 42–51.

*Primary Examiner*—Willis R. Wolfe
*Assistant Examiner*—Hieu T. Vo
*Attorney, Agent, or Firm*—Mony R. Ghose

[57] ABSTRACT

A method for automatically updating shared secret data stored in a mobile terminal comprises initiating a shared secret data update procedure upon receipt of an access attempt by a mobile terminal in a mobile switching center. The shared secret data update procedure is initiated in accordance with a schedule determined by the wireless service provider. Reporting of the outcome of the shared secret data update attempt is issued by the mobile switching center to wireless service provider personnel for telecommunications system maintenance purposes. Advantageously, shared secret data updates occur automatically without intervention by wireless service provider personnel.

13 Claims, 2 Drawing Sheets

5,890,075

METHOD FOR REMOTELY UPDATING DATA STORED IN A MOBILE TERMINAL BY A WIRELESS TELECOMMUNICATIONS SYSTEM

FIELD OF THE INVENTION

This invention relates to wireless, telecommunications systems, and more particularly, to curbing the proliferation of cloned mobile terminals used in such wireless telecommunications systems.

BACKGROUND OF THE INVENTION

Fraud is a growing problem in the mobile telecommunications industry. More particularly, mobile terminal cloning is rampant in wireless markets in the United States, and around the world. Cloning is a fraudulent procedure in which valid electronic serial numbers (ESN), and valid mobile identification numbers (MIN) are obtained from mobile terminals which broadcast this information during every access attempt. The most common method for obtaining ESN and MIN information is by using readily-available scanners positioned along major traffic routes in heavy, wireless user markets. Once a cloner has obtained a valid ESN/MIN, the numbers are programmed into a different, fraudulent mobile terminal. The fraudulent mobile terminal subsequently becomes a "clone", and may be used to place calls which are billed to the non-fraudulent owner of the mobile terminal identified by the ESN/MIN numbers. In response to the cloning epidemic, mobile terminal authentication efforts have been introduced. Particularly, mobile terminal manufacturers store a piece of data known as "shared secret data" (SSD) in each mobile terminal. Whenever a mobile terminal accesses a wireless telecommunications system, the system challenges the mobile terminal to provide a response based on an algorithm incorporating the stored SSD. The initial SSD value stored in each mobile terminal by the manufacturer is usually a universal, default value.

Although the SSD is not transmitted over an air interface, disingenuous parties have designed methods for obtaining SSD values, and bypassing authentication procedures. For example, cloners often navigate authentication procedures by mimicking authentication responses using a typical, default SSD value. Accordingly, a messaging protocol has been established to update the default SSD value stored in a mobile terminal. Conventional updates are implemented by a wireless service provider, and require manual intervention by a wireless service technician. More particularly, the wireless-service technician monitors the wireless telecommunications system to identify an "active" mobile terminal (that is, a mobile terminal able to receive challenges from the wireless system). Upon identification of an active mobile, the technician attempts an SSD update using an authentication database. The update occurs only if the mobile terminal is active, and the wireless service technician happens to attempt the update. In other words, the present update system relies on the random chance of the wireless service technician finding an active mobile terminal. For this reason, the current SSD update procedure results in sporadic updates. Accordingly, using conventional techniques, there is a high probability that most of the 100,000+ mobile terminals served in a typical wireless market will not have their default SSD values changed in a timely manner, leaving these mobiles more susceptible to cloning. Therefore, there is a need in the art for ensuring that default SSD values can be predictably and expeditiously updated by wireless service providers.

SUMMARY OF THE INVENTION

This need is addressed, and a technological advance is achieved in the telecommunications art, by automatically updating an SSD value stored in a mobile terminal responsive to subscriber-initiated, mobile terminal triggers which increase the likelihood of successful SSD updates.

In one preferred embodiment, the SSD updates are attempted when a mobile terminal accesses the wireless telecommunications system. If the update is successful, a "success" report is issued to wireless service provider personnel. If the update fails, the call is optionally disconnected, and a "failure" report is issued to wireless service provider personnel. Advantageously, monitoring of the wireless telecommunications system by a wireless service technician for manually attempting SSD updates is not required. Instead, SSD updates are automatically scheduled, and executed by the wireless telecommunications system. Further, wireless service personnel are provided with a status report of successful, failed and unattempted SSD updates for network management purposes.

DETAILED DESCRIPTION OF THE INVENTION

Figure 1:
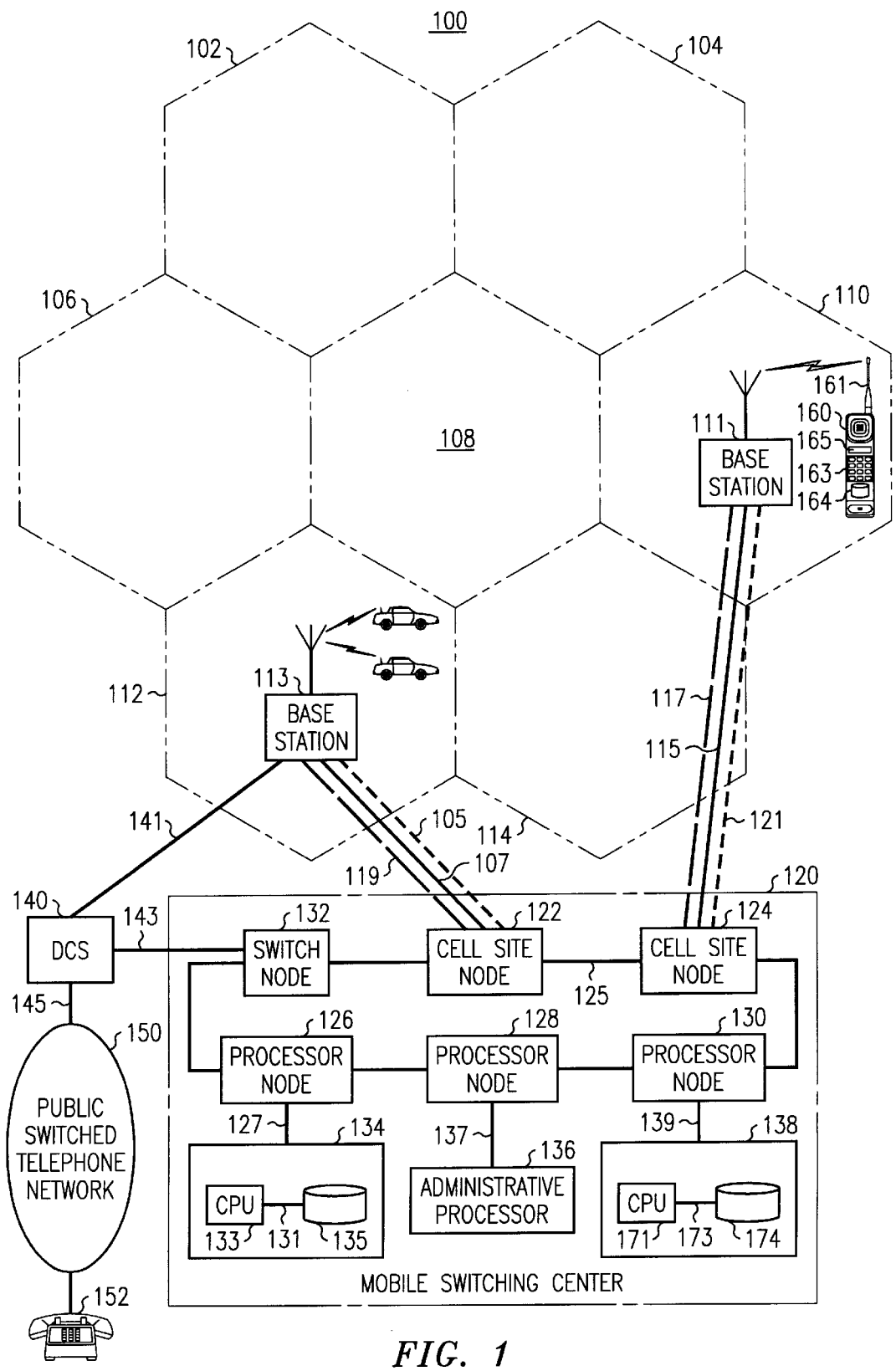
FIG. 1 is a block diagram of a wireless mobile telecommunications system in which the present invention may be practiced.

FIG. 1 is a simplified block diagram of a wireless telecommunications system in which the preferred embodiment of the present invention is incorporated. Wireless telecommunications system 100 includes a plurality of cell sites identified as cell site 102, 104, 106, 108, 110, 112 and 114. All cell sites (geographic "coverage areas") include base stations with antennas for serving mobile subscribers located in the geographic area defined by the cell site. In the embodiment shown, cell sites 110, and 112 support base stations 111, and 113 respectively. Base station 111 is interconnected to mobile switching center 120 via bi-directional trunk 115, voice radio link 117 and control radio link 121. Similarly, base station 113 is interconnected to mobile switching center 120 via control link 105, bidirectional trunk 107, and voice radio link 119. Although all base stations in telecommunications system 100 are interconnected to digital switch 140, only the interconnection of base station 113 to digital switch 140 via bi-directional trunk 141 is shown for illustrative purposes.

In the embodiment shown, there are two mobile subscribers located within the geographic boundaries of cell site 112. There is also a mobile subscriber using mobile terminal 160 within the geographic boundary of cell site 110. Mobile terminal 160 is a commercially-available, authentication-capable, wireless telephone including antenna 161, keypad 163 and display screen 165. Mobile terminal 160 also includes database 164 for storing SSD data, and related algorithms. In this embodiment, assume mobile terminal 160 contains the default SSD value entered by the mobile terminal manufacturer.

In the preferred embodiment, mobile switching center 120 is the AUTOPLEX® 1000 system manufactured, and sold, by Lucent Technologies. However, those skilled in the art will recognize that other mobile switching centers may be used. Mobile switching center 120 comprises a plurality of nodes interconnected via transmission medium 125, and a plurality of processors for administering wireless telecommunications services and storing subscriber data. In this embodiment, cell site node 122 serves base station 113 of cell site 112, and cell site node 124 serves base station 111 of cell site 110. Digital switch 140 is interconnected to mobile switching center 120 via switch node 132, and bi-directional trunk 143. Switch node 132 is an interface between mobile switching center 120, and digital switch 140. In this example, digital switch 140 is interconnected to the rest of public-switched telephone network (PSTN) 150 via bidirectional trunk 145. Also shown is telephone 152 served by PSTN 150.

Processor node 126 is interconnected to call processor 134 via data link 127. Call processor 134 includes central processing unit 133 interconnected to database 135 by data link 131. In this example, call processor 134 serves base stations located in cell sites 102, 106, 108 and 112 (including base station 113). Database 135 stores information, including authentication algorithms, SSD update controls, and protocols for creating SSD status reports for wireless service technical personnel.

Processor node 128 interconnects administrator processor 136 to transmission medium 125 via data link 137. Administrative processor 136 performs maintenance functions and other administrative tasks for mobile switching center, as known in the art.

Processor node 130 interconnects call processor 138 to transmission medium 125 via data link 139. In this embodiment, call processor 138 serves base stations associated with cell sites 104, 110 and 114. Therefore, call processor 138 serves base station 111 of cell site 110. Call processor 138 includes central processing unit 171 interconnected to data base 174 via data link 173. Information including authentication algorithms, SSD update controls, and protocols for creating SSD status reports are stored in database 174.

During normal operation, call processors 134 and 138 receive access requests from mobile subscribers located in cell sites 102, 104 . . . 114. These access requests may be in the form of a call origination request occurring when a subscriber places a call, a termination request when a subscriber receives a call, or an autonomous registration occurring when a subscriber simply turns a mobile terminal "on". The call processors determine the authenticity of each mobile terminal requesting access, and establish voice channels, control channels or call connections for the mobile terminal in accordance with procedures well known in the art. Each call processor also stores SSD update scheduling data for a particular mobile terminal for which wireless telecommunications system 100 is the "home" system.

Figure 2:
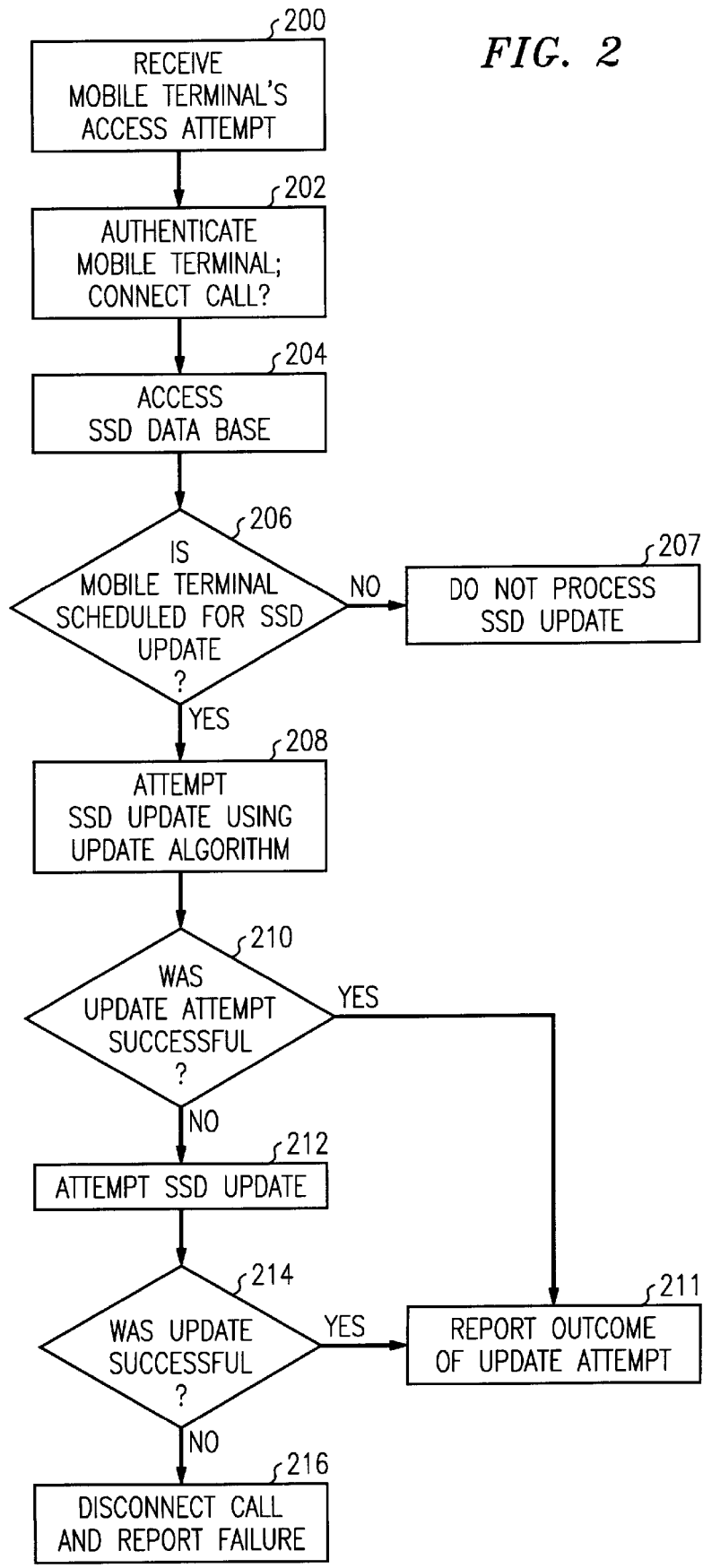
FIG. 2 is a flow diagram illustrating the steps performed in the wireless telecommunications system of FIG. 1 in accordance with the preferred embodiment of the present invention.

FIG. 2 is a flow diagram illustrating the steps performed in wireless telecommunications system 100 for updating SSD data stored in mobile terminals. The process begins in step 200 in which a mobile switching center receives an access attempt from a mobile terminal. For purposes of example, assume that mobile switching center 120 receives a call origination access attempt from mobile terminal 160 located in cell site 110 of wireless telecommunications system 100. Also assume that wireless telecommunications system 100 is the "home" system for mobile terminal 160, and that the terminal is scheduled for SSD updates on a per-call basis. Accordingly, database 174 (that is, the database which stores SSD data for mobile terminal 160) has been initialized with SSD update schedules and data associated with mobile terminal 160.

The process continues to step 202 in which the mobile terminal requesting access is authenticated using procedures known in the art. In this example, mobile terminal 160 is authenticated by call processor 138 using authentication algorithms stores in database 174. In step 204, the mobile switching center accesses SSD information stored in a call processor database. In this example, mobile switching center 120 accesses the SSD update schedule stored in call processor database 174. The process continues to decision step 206 in which the mobile switching center determines whether the mobile terminal is scheduled for an SSD update. In the preferred embodiment, the SSD update schedule is established by the wireless service provider. To obtain maximum protection against cloning fraud, SSD updates are attempted each time a mobile terminal accesses the wireless telecommunications system. Alternatively, SSD updates may be scheduled on a weekly basis, an accumulative call-count basis (e.g., every tenth call), a time interval basis, a change in geographic location of the mobile terminal, or some combination thereof. In this example, the SSD value is updated at every access attempt. If the outcome of decision step 206 is a "NO" determination, the process continues to step 207 in which an SSD update is not attempted. If, the outcome of decision step 206 is a "YES" determination, the process continues to step 208 in which the mobile switching center attempts an SSD update using the update algorithm stored in the call processor database. In this example, mobile switching center 120 attempts an SSD update of the SSD value stored in mobile terminal 160 using an update algorithm contained in call processor database 174. The update process comprises a series of messages relayed between the mobile terminal and the mobile switching center for storing a new SSD value in both entities.

The process continues to decision step 210 in which the mobile switching center determines whether the update attempt was successful. If the outcome of decision step 210 is a "YES" determination, the process continues to step 211 in which a successful SSD update is reported to wireless service personnel. In the preferred embodiment, the report is generated by the mobile switching center and forwarded to a printer maintained by the wireless service provider. The mobile switching center may also be programmed to periodically scan call processor databases to determine the SSD update status of all "home" mobile terminals. A report including the status of each mobile terminal is then generated for use by wireless service provider personnel for network management purposes. More particularly, the status reports contain the update status (e.g., success, failed, pending) of each home mobile terminal so that the wireless service provider can determine which mobile terminals still require SSD updates. If the outcome of decision 210 is "NO" determination, the process (optionally) continues to step 212 in which another SSD update is attempted using the update algorithm stored in the call processor database. In decision 214, the mobile switching center determines whether the subsequent update attempt was successful. If the outcome of decision step 214 is a "YES" determination, the process continues to step 211 in which the success report is generated, as previously described. If the outcome of decision 214 is a "NO" determination, the process continues to step 216 in which the ongoing call is disconnected, and a failure report is generated for forwarding to the wireless service provider personnel. In an alternative embodiment, the ongoing call may continue while the SSD failure report is forwarded to the wireless service personnel.

In another preferred embodiment, the call processors in a mobile switching center periodically access the SSD update schedule stored in call processor databases to determine which mobile terminals require SSD updates. Once a mobile terminal scheduled for an SSD update is identified as active, the call processor autonomously attempts to perform the SSD update by accessing the mobile terminal via a control channel. In this preferred embodiment, the mobile terminal need not be involved in a call for the update to occur. Indeed, a mobile terminal need only be registered (that is, in a "ON" state) for the SSD update to be attempted. Advantageously, the preferred embodiments allow a wireless telecommunication service provider to automatically update default SSD values stored in mobile terminals responsive to any attempted access by a wireless subscriber. Further, generation of SSD update status reports allows the wireless service provider to monitor the SSD update status of all "home" mobile terminals registered in the wireless telecommunications system.

Although the invention has been described with respect to a preferred embodiment, those skilled in the art may devise numerous other arrangements without departing from the scope of the invention as defined in the following claims.

What is claimed is:

1. A wireless telecommunications switching system for establishing call connection among mobile terminals and the public switch telephone network comprises:

automated processor means for initiating a shared secret data (SSD) update responsive to mobile terminal access; and storage means for storing shared secret data update schedules for each mobile terminal in the wireless telecommunications system.

2. In a wireless telecommunications system serving a plurality of mobile terminals, a method for updating shared secret data information stored in a mobile terminal comprises the steps of:

accessing a shared secret data (SSD) update schedule for determining whether a particular mobile terminal is scheduled for a shared secret data update attempt;

scanning the wireless telecommunications system to determine whether the mobile terminal is capable of receiving a shared secret data update attempt; and initiating a shared secret data update attempt responsive to a determination that the mobile terminal is capable of receiving a shared secret data update attempt.

3. In a wireless telecommunications system serving a plurality of mobile terminals, a method for updating shared secret data stored in a mobile terminal comprises the steps of:

receiving an access attempt from the mobile terminal;

determining whether the mobile terminal is scheduled for a shared secret data update; and initiating a shared secret data update procedure responsive to a determination that the mobile terminal is scheduled for a shared secret data update.

4. The method of claim 3 and further comprising the step of:

reporting the result of the shared secret data update attempt to the wireless service provider.

5. The method of claim 3 wherein the step of initiating a shared secret data update procedure comprises the step of:

initiating a shared secret data update attempt each time the mobile terminal accesses the wireless telecommunications system.

6. The method of claim 3 wherein the step of initiating a shared secret data update procedure comprises the step of:

initiating a shared secret data update to change a default shared secret data value stored in the mobile terminal.

7. The method of claim 3 wherein the step of initiating a shared secret data update procedure comprises the step of:

initiating a shared secret data update attempt after a predetermined number of calls initiating by the mobile terminal.

8. The method of claim 3 wherein the step of initiating a shared secret data update procedure comprises the step of:

initiating a shared secret data attempt after a predetermined time interval.

9. The method of claim 8 further comprising the step of:

periodically issuing an SSD update status report for all "home" mobile terminals.

10. The wireless telecommunications switching system of claim 9 wherein the shared secret data schedule is determined by wireless service provider personnel.

11. The wireless telecommunications switching system of claim 9 wherein the shared secret data update attempt is initiated by a user of the mobile terminal.

12. The method of claim 8 and further comprising the step of:

issuing an SSD status report to wireless service personnel after each SSD update attempt.

13. The method claim 3 wherein the step of initiating a shared secret data update procedure comprises the step of:

initiating a shared secret data update attempt based on changes in geographical location.

* * * * *